United States Patent
Khan et al.

(10) Patent No.: US 10,057,898 B2
(45) Date of Patent: Aug. 21, 2018

(54) DOWNLINK AND UPLINK DATA MULTIPLEXING ON WIDELY SPACED FREQUENCIES IN WIRELESS BROADBAND COMMUNICATION SYSTEM

(71) Applicant: Phazr, Inc., Allen, TX (US)

(72) Inventors: Farooq Khan, Allen, TX (US); Robert Clark Daniels, Round Rock, TX (US)

(73) Assignee: Phazr, Inc., Allen, TX (US)

( * ) Notice: Subject to any disclaimer, the term of this patent is extended or adjusted under 35 U.S.C. 154(b) by 61 days.

(21) Appl. No.: 15/386,227

(22) Filed: Dec. 21, 2016

(65) Prior Publication Data
US 2018/0176897 A1    Jun. 21, 2018

(51) Int. Cl.
*H04W 4/00* (2018.01)
*H04W 72/04* (2009.01)
*H04W 72/08* (2009.01)
*H04W 88/02* (2009.01)
*H04W 88/08* (2009.01)

(52) U.S. Cl.
CPC ....... *H04W 72/044* (2013.01); *H04W 72/087* (2013.01); *H04W 88/02* (2013.01); *H04W 88/08* (2013.01)

(58) Field of Classification Search
CPC .... H04W 72/087; H04W 88/02; H04W 88/08
USPC .......................................................... 370/330
See application file for complete search history.

(56) References Cited

U.S. PATENT DOCUMENTS

| | | | | |
|---|---|---|---|---|
| 2002/0045459 A1* | 4/2002 | Morikawa | ......... | H04W 72/0453 455/517 |
| 2011/0261732 A1* | 10/2011 | Tanno | ................... | H04W 16/14 370/281 |
| 2012/0155341 A1* | 6/2012 | Yamamoto | ........... | H04B 7/0617 370/281 |
| 2013/0170468 A1* | 7/2013 | Baker | ................. | H04W 72/085 370/330 |
| 2013/0260806 A1* | 10/2013 | Allpress | ................. | H04B 15/00 455/501 |
| 2015/0289080 A1* | 10/2015 | Wu | ........................ | H04W 4/005 370/329 |
| 2016/0044689 A1* | 2/2016 | Wen | ..................... | H04J 11/0023 370/330 |
| 2016/0057746 A1* | 2/2016 | Drucker | ............... | H04B 7/2615 370/280 |
| 2017/0289108 A1* | 10/2017 | Lee | ........................ | H04L 5/0055 |
| 2017/0339717 A1* | 11/2017 | Futaki | ................... | H04W 16/14 |

* cited by examiner

*Primary Examiner* — Faisal Choudhury
(74) *Attorney, Agent, or Firm* — Michael A. Rahman

(57) ABSTRACT

Methods and systems for multiplexing downlink and uplink data on widely spaced frequencies are disclosed. The method of multiplexing downlink and uplink data packets for providing wireless broadband link between a base station and a plurality of client devices includes transmitting a first data packet by the base station to a first client device at a downlink frequency during a first time interval. The method includes receiving a second data packet by the base station from a second client device at an uplink frequency during a second time interval, wherein the base station concurrently transmits at least a portion of the first data packet to the first client device and receives at least a portion of the second data packet from the second client device, and wherein there is a wide separation between the downlink frequency and the uplink frequency.

22 Claims, 7 Drawing Sheets

DOWNLINK AND UPLINK DATA MULTIPLEXING ON WIDELY SPACED FREQUENCIES IN WIRELESS BROADBAND COMMUNICATION SYSTEM

TECHNICAL FIELD

This application relates generally to wireless communications, and more specifically to downlink and uplink data multiplexing on widely spaced frequencies in wireless broadband communication system.

BACKGROUND

Current wireless communication systems are based on two popular standards: a wide area network (WAN) standard referred to as the Fourth Generation Long Term Evolution (4G LTE); and a local area network (LAN) standard called Wi-Fi. Wi-Fi operates on shared or unlicensed spectrum as short-range wireless extension of wired broadband systems. The 4G LTE on the other hand provides wide area long-range connectivity using licensed spectrum and dedicated infrastructure such as cell towers and backhauls to connect to the Internet.

As more people connect to the Internet, increasingly chat to friends and family, watch videos, listen to streamed music, and indulge in virtual or augmented reality experience, data traffic continues to grow at unprecedented rates. In order to address the continuously growing wireless capacity need, the next generation LAN and WAN systems are expected to use higher frequencies referred to as millimeter wave spectrum shown in Table 1.

TABLE 1

Examples of millimeter wave bands

| Bands [GHz] | Frequency [GHz] | Bandwidth [GHz] |
|---|---|---|
| 24 GHz | 24.25-24.45 | 0.200 |
|  | 24.75-25.25 | 0.500 |
| 28 GHz/LMDS | 27.5-28.35 | 0.850 |
|  | 29.1-29.25 | 0.150 |
|  | 31-31.3 | 0.300 |
| 32 GHz | 31.8-33 | 1.200 |
| 37 GHz | 37.0-38.6 | 1.600 |
| 39 GHz | 38.6-40 | 1.400 |
| 42 GHz | 42.0-42.5 | 0.500 |
| 47 GHz | 47.2-50.2 | 3.000 |
| 50 GHz | 50.4-52.6 | 1.200 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

The two most commonly used unlicensed frequency bands below 6 GHz are the 2.4 GHz band and the 5 GHz band. The 5 GHz unlicensed band offers many hundreds of megahertz (MHz) spectrum as illustrated in FIG. 1. The 2.4 GHz and 5 GHz unlicensed bands are generally used by the local area network (LAN) standard called Wi-Fi. The 4G LTE cellular systems generally use licensed bands below 6 GHz.

Current 4G LTE and LAN networks that utilize time division duplex (TDD) suffer from numerous drawbacks. Since downlink (DL) and uplink (UL) use the same frequency band in TDD-based 4G LTE and LAN, DL signals transmitted by a base station or an access point at high power interfere with UL signals transmitted by client devices at low power to another base station. Similarly, the signals transmitted from one client device connected to a base station will interfere with the signals received by another client device connected to another base station. Consequently, transmitters and receivers must be synchronized so that UL and DL data packets are transmitted in respective time slots to avoid interference. Thus, a client device (e.g., mobile phone) must wait for a UL time slot before commencing UL transmission. Similarly, a base station or access point must wait for a DL time slot before the base station or access point may commence DL transmission. As a result, delay is caused in UL and DL transmissions. Also, hardware including synchronization circuits are necessary to synchronize the client device with the base station or access point, which increases overcall cost of the systems. Furthermore, if the data packets transmitted by a client device or a base station only partially fills the time slots due to the size of the data packets, transmission throughput is reduced because of unfilled or wasted time slots.

In 4G LTE and LAN networks that utilize frequency division duplex (FDD), transmitters and receivers can operate asynchronously because UL and DL frequencies are different. However, because UL and DL frequencies are not widely spaced or separated, the transmitter's output may overload the receiver's input. Consequently, transmitters and receivers require high-complexity multi-pole filters to provide significant attenuation to prevent the transmitter's output from overloading the receiver's input.

Furthermore, TDD-based systems need to maintain guard time intervals between downlink and uplink transmissions to account for propagation delays and to account for data processing times at the receiver. Similarly, in FDD-based systems, guard bands need to be provided to reduce interference between downlink and uplink transmissions. Both the guard times and guard bands result in waste of system resources.

SUMMARY

According to disclosed embodiments, downlink and uplink data is multiplexed on widely spaced frequencies to lower the system cost and improve system latency and efficiency.

In one aspect, a method of multiplexing downlink and uplink data packets in widely spaced frequencies for providing wireless broadband link between a base station and a plurality of client devices includes transmitting a first data packet by the base station to a first client device at a downlink frequency f1 during a first time interval. The method includes receiving a second data packet by the base station from a second client device at an uplink frequency f2 during a second time interval, wherein the base station concurrently transmits at least a portion of the first data packet to the first client device and receives at least a portion of the second data packet from the second client device, and wherein there is a wide separation between the downlink frequency f1 and the uplink frequency f2.

In one aspect, the base station transmits downlink data packets and receives uplink data packets without any guard time intervals. The client device may be a wireless modem or may be a mobile communication device.

In one aspect, a method of multiplexing downlink and uplink data packets in widely spaced frequencies for providing wireless broadband link between a base station and a plurality of client devices includes transmitting a first data packet by the base station to a first client device at a downlink frequency f1 during a first time interval. The method includes receiving a second data packet by the base station from a second client device at an uplink frequency f2 during a second time interval, wherein the base station concurrently transmits at least a portion of the first data packet to the first client device and receives at least a portion of the second data packet from the second client device, and wherein there is a wide separation between the downlink frequency f1 and the uplink frequency f2. The method includes receiving a third data packet by the base station from a third client device at the uplink frequency f2 during a third time interval and transmitting a fourth data packet by the base station to the second client device at the downlink frequency f1, wherein the base station concurrently transmits at least a portion of the fourth data packet to the second client device and receives at least a portion of the third data packet from the third client device.

DETAILED DESCRIPTION OF THE DISCLOSED EMBODIMENTS

Figure 1:
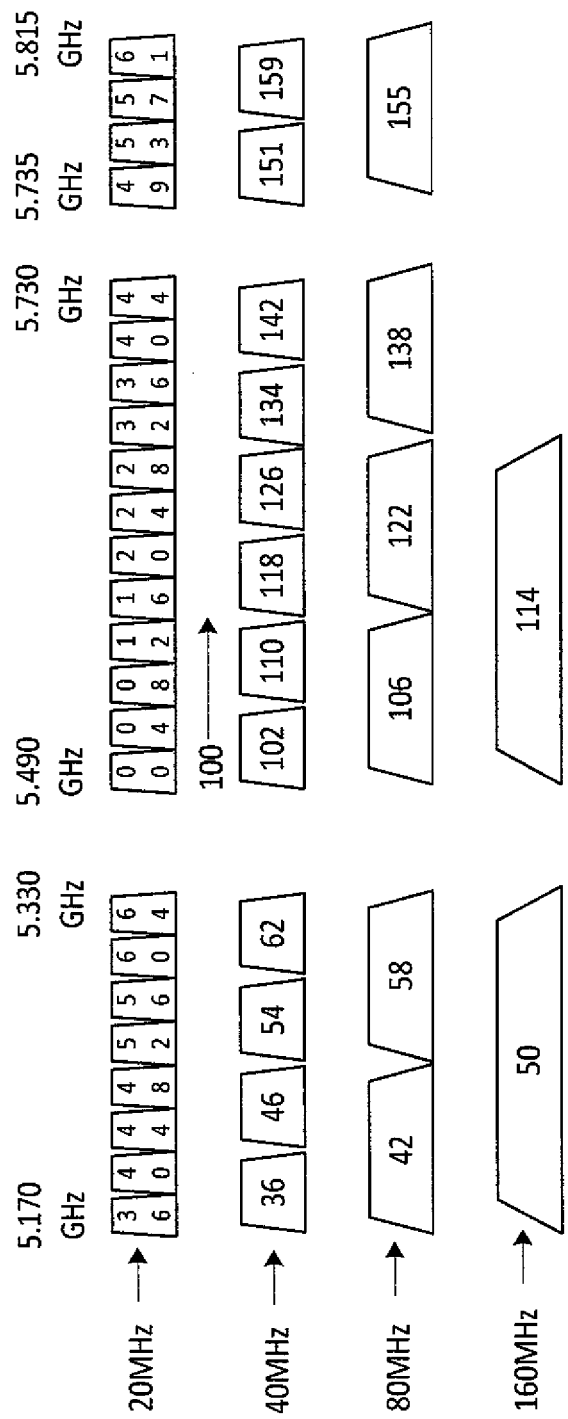
FIG. 1 illustrates the spectrum of 5 GHz unlicensed band.
Figure 2:
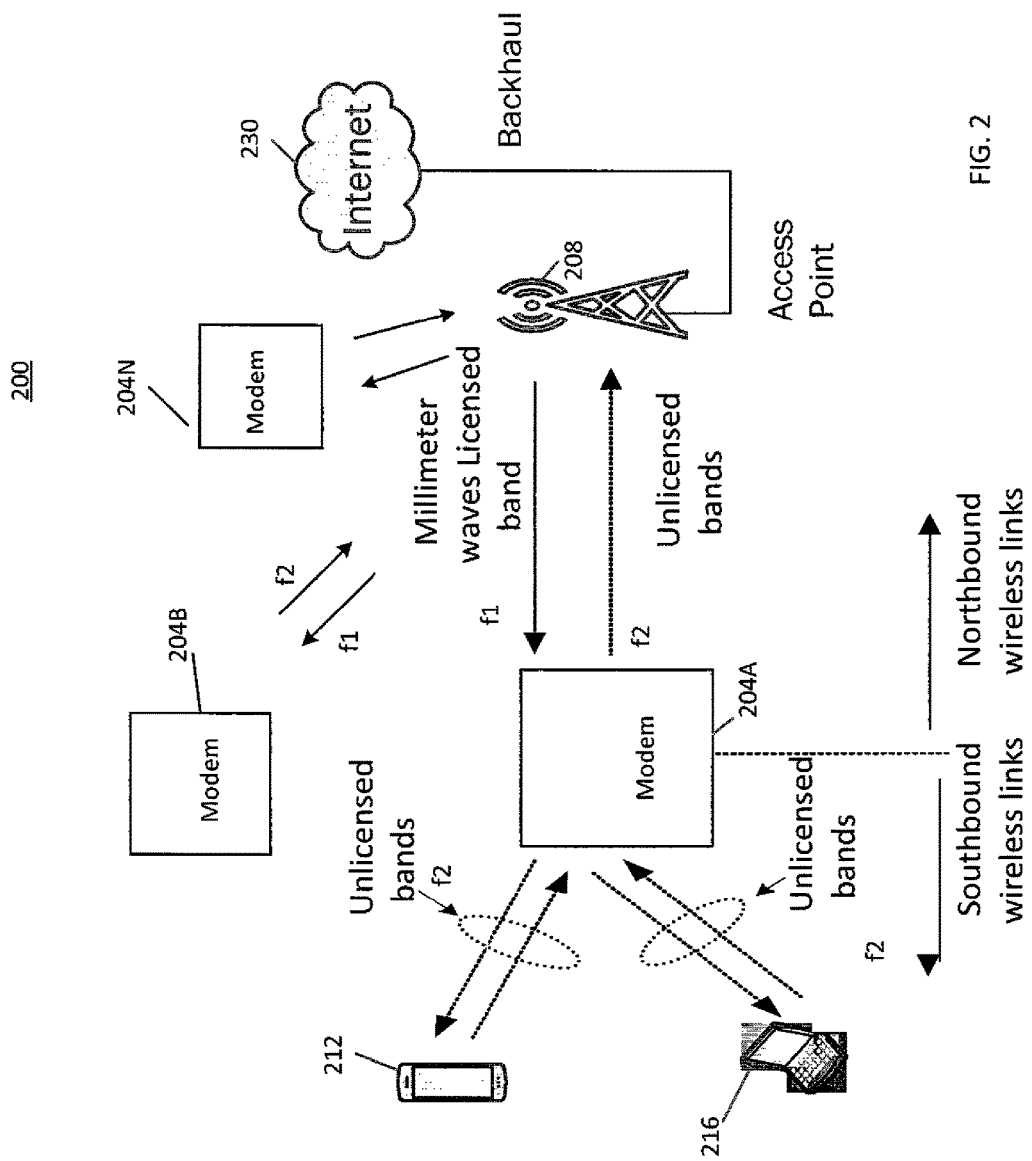
FIG. 2 illustrates a wireless network in accordance with disclosed embodiments.

FIG. 2 illustrates an exemplary wireless network 200 in accordance with disclosed embodiments. In wireless network 200, downlink and uplink data is multiplexed on widely spaced frequencies, thereby improving system latency and efficiency.

Network 200 includes a plurality of wireless broadband modems 204A-204N that communicate with access point or base station 208 (access points and base stations are used herein interchangeably). Access point 208 is connected to the Internet 230 via wired link 234 such as, for example, an optical fiber link having Gigabit/s capacity. Although FIG. 2 illustrates only one access point (i.e., access point 208), network 200 includes a plurality of access points or base stations connected to the Internet 230 via wired links.

Referring to FIG. 2, wireless broadband modem 204A communicates with a plurality of communication devices (e.g., mobile phones, laptop computers). For example, modem 204A communicates with communication devices 212 and 216. Modem 204A receives data from access point 208 at frequency f1 in a millimeter wave spectrum. According to some disclosed embodiments, the millimeter wave spectrum may be a licensed millimeter wave spectrum, and according to other embodiments, the millimeter wave spectrum may be an unlicensed millimeter wave spectrum. The licensed millimeter wave spectrum may, for example, be the 28 GHz or 37-40 GHz band. Modem 204A transmits data to access point 208 at frequency f2 in an unlicensed shared spectrum. The unlicensed shared spectrum may, for example, be the 2.4 GHz, 3.5 GHz, 5 GHz or 60 GHz band. Modem 204A transmits data to communication devices 212 and 216 at frequency f2 in an unlicensed shared spectrum and receives data from communication devices 212 and 216 at frequency f2. Similarly, Modems 204B-204N transmit data to communication devices (not shown in FIG. 2) at frequency f2. In other embodiments, f2 may be 28 GHz, 24-25 GHz, 3.5 GHz or less than 6 GHz. Modems 204A-204N and communication devices 212 and 216 are hereinafter also referred to as client devices. The millimeter wave licensed band signals (i.e., downlink signals) are transmitted by access point or base station 208 which has a large form factor and operates at high power, and the unlicensed shared band signals (downlink and uplink signals) are transmitted by modems 204A-204N and communication devices 212 and 216 which have a small form factor and operate at low power. The uplink and downlink between modem 204A-204N and access point 208 are referred to herein as northbound wireless links, and the uplink and downlink between modem 204A-204N and communication devices are referred to herein as southbound wireless links.

As discussed before, access point 208 transmits data to modem 204A at frequency f1 in a licensed millimeter wave spectrum (e.g., 28 GHz, 37-40 GHz band) and receives data from modem 204A at frequency f2 in an unlicensed shared spectrum (e.g., 2.4 GHz, 3.5 GHz, 5 GHz or 60 GHz band). Since, there is a wide separation between the licensed millimeter wave bands and the unlicensed shared bands, uplink and downlink transmissions may occur without the need for expensive filters. Also, the frequency spectrum between the downlink and uplink frequencies can be used for other wireless services eliminating waste due to guard bands.

Figure 3:
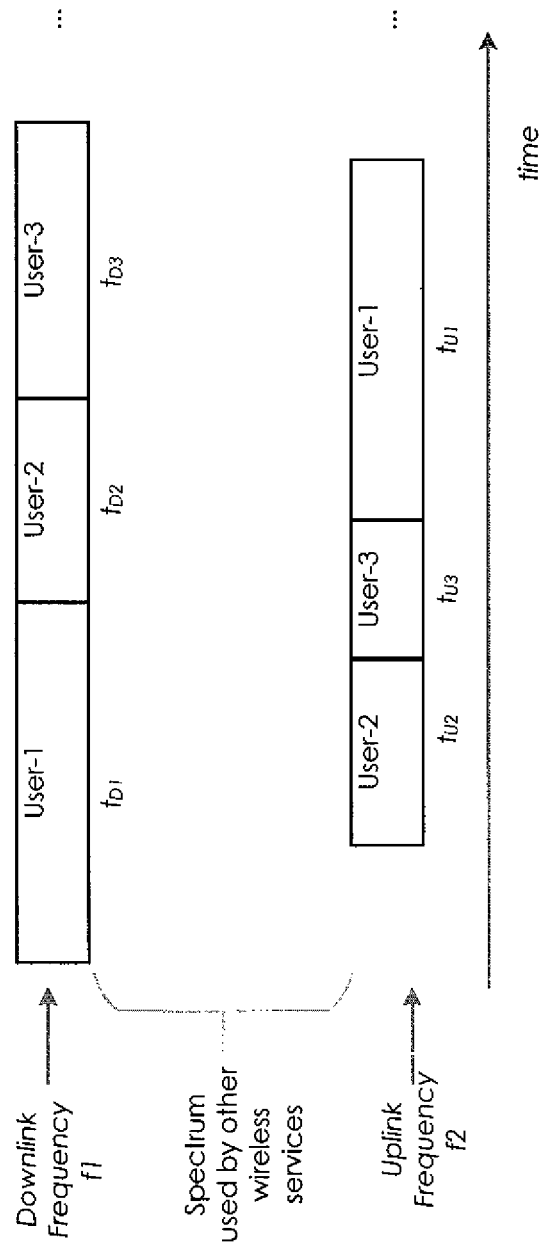
FIG. 3 illustrates data packet transmissions by an access point or base station and by client devices.

FIG. 3 illustrates exemplary data packet transmissions by an access point or base station and by client devices according to the principles of the present invention. The downlink and uplink data packets are multiplexed on widely spaced frequencies, thereby improving system latency and efficiency.

By way of example, a client device may be a wireless modem configured to communicate with the access point or base station. Also, a client device may be a wireless communication device such as a mobile phone or a laptop computer. During time interval tD1 the access point or base station transmits data to a first client device at the downlink frequency f1. During time interval tU2, a second client device transmits data to the access point or base station at the uplink frequency f2. Since, there is a wide band separation between the downlink frequency f1 and uplink frequency f2, the access point or base station can transmit downlink signals to the first client device while concurrently receiving uplink signals from the second client device without the need for expensive filters. Also, the frequency spectrum between the downlink and uplink frequencies can be used for other wireless services eliminating waste due to guard bands.

Referring to FIG. 3, during time interval tU3, a third client device transmits data to the access point or base station at the uplink frequency f2. The access point or base station transmits data to the second client device at the downlink frequency f1 during time interval tD2. Since the access point or base station can concurrently transmit and receive data, tD2 and tu3 can overlap, thus reducing system latency and improving efficiency.

The first client device transmits data to the access point or base station at the uplink frequency f2 during time interval tU1. The access point or base station transmits data to the third client device at the downlink frequency f1 during time interval tD3. No guard time interval is required as the uplink and downlink transmissions can happen asynchronously. As illustrated in FIG. 3, at a given time, a client device is either transmitting or receiving but the downlink and uplink frequency bands can be fully utilized across different client devices.

Figure 4:
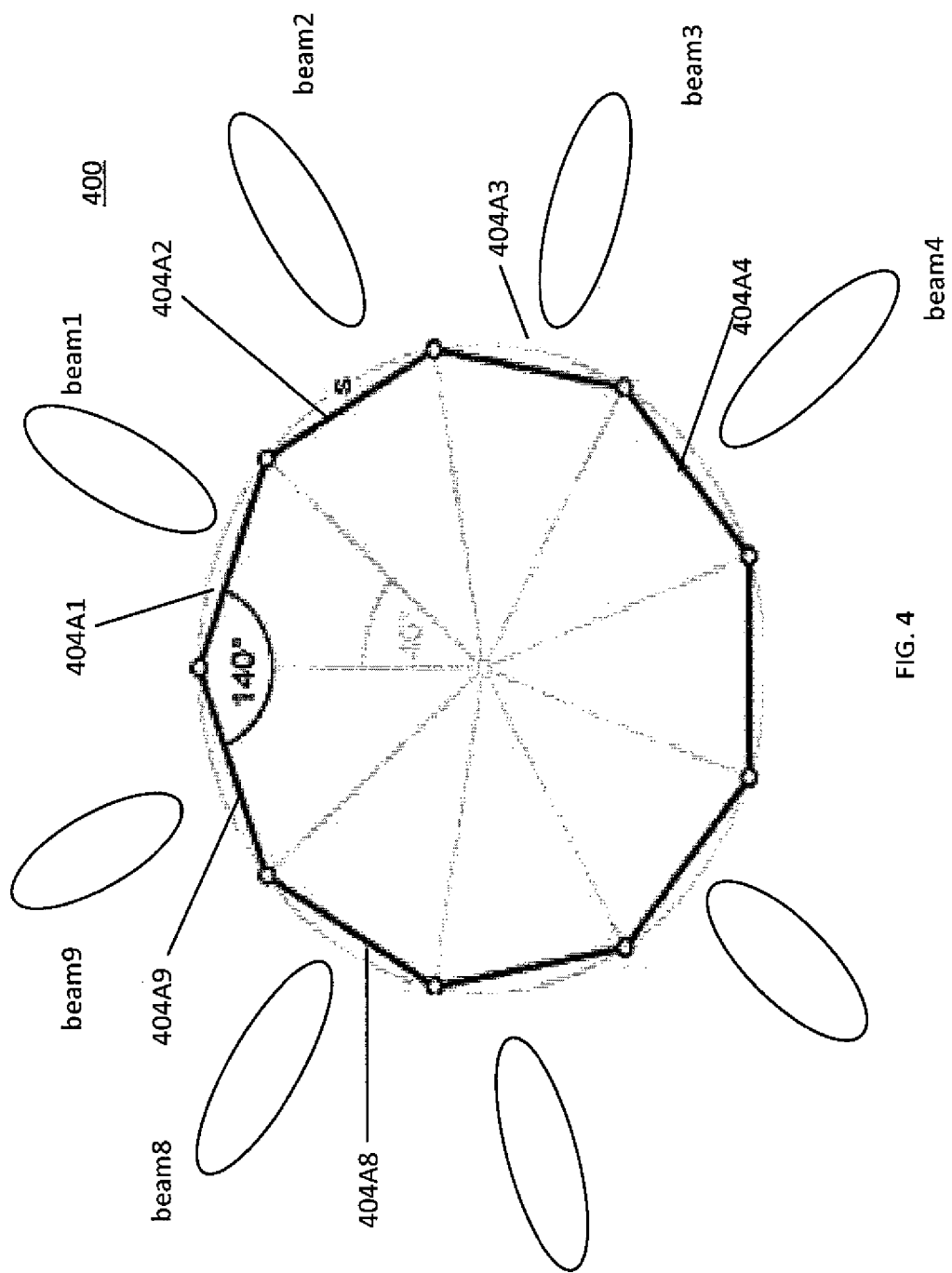
FIG. 4 illustrates a top view of an access point or base station.

FIG. 4 illustrates a top view of an exemplary access point or base station 400. According to principles of the present invention, access point or base station 400 multiplexes downlink and uplink data packets on widely spaced frequencies. Consequently, access point or base station 400 can transmit downlink signals to a first client device while concurrently receive uplink signals from a second client device without the need for expensive filters, thereby improving system latency and efficiency. Also, the frequency spectrum between the downlink and uplink frequencies can be used for other wireless services eliminating waste due to guard bands.

Referring to FIG. 4, access point or base station 400 comprises 9 antennas 404A1-404A9 positioned radially with respect to common axis 408. Antennas 404A1-404A9 are configured to create beam1-beam9, respectively. The orientation of the antennas 404A1-404A9 enables each beam to provide 40 degrees coverage, thereby allowing base station 400 to cover 360 degrees. According to some disclosed embodiments, antennas 404A1-404A9 may be array antennas.

Although the exemplary access point or base station 400 is shown comprising 9 antennas, base station 400 can be built with any suitable number of antennas according to the principles of the present invention. For example, base station 400 may include 3, 4, 5, 6, 7, 8, 10 or more antennas generating respective beams. Each beam provides coverage for a predetermined degree of angles.

According to disclosed embodiments, beam1-beam9 can be created by physically orienting antennas 404A1-404A9 in a nonagon shape with 40 degrees orientation change from one antenna to the next. Alternatively, beam1-beam9 can be created electronically by phase and amplitude control of the transmitted signals in a phased-array arrangement.

Figure 5:
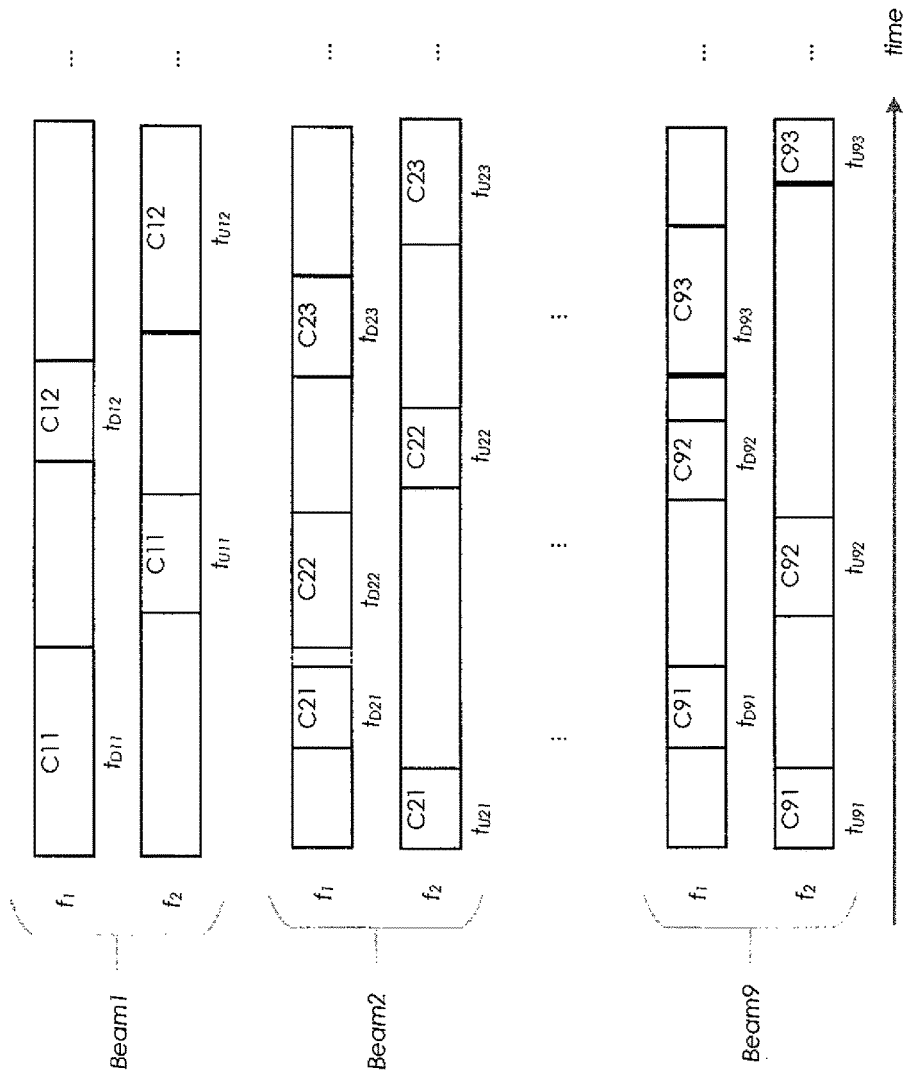
FIG. 5-6 show communication between an access point or base station and plurality of client devices.

FIG. 5 shows communication between access point or base station 400 and plurality of wireless devices in accordance with some disclosed embodiments. Access point or base station 400 uses a plurality of beams to communicate with the wireless devices. The wireless device may be a wireless modem configured to communicate with the access point or base station. Alternatively, the wireless device may be a mobile phone, a laptop computer or any other wireless communication device configured to communicate with the access point or base station.

Referring to FIG. 5, access point or base station 400 transmits data to communication device C11 on Beam1 at the downlink frequency f1 for a time interval of tD11. The communication device C11 transmits data to access point or base station 400 on Beam1 at the uplink frequency f2 for a time interval of tU11. Access point or base station 400 transmits data to communication device C12 on Beam1 at the downlink frequency f1 for a time interval of tD12. The communication device C12 transmits data to access point or base station 400 on Beam1 at the uplink frequency f2 for a time interval of tU12. Thus, in this exemplary embodiment, access point or base station 400 and the communication devices C11 and C12 either transmit or receive data over a given beam (i.e., Beam1) during a given time interval.

Referring again to FIG. 5, the communication device C21 transmits data to the access point or base station on Beam2 at the uplink frequency f2 for a time interval of tU21. The access point or base station transmits data to the communication device C21 on Beam2 at the downlink frequency f1 for a time interval of tD21. The access point or base station transmits data to communication device C22 on Beam2 at the downlink frequency f1 for a time interval of tD22. The communication device C22 transmits data to the access point or base station on Beam2 at the uplink frequency f2 for a time interval of tU22. The access point or base station transmits data to communication device C23 on Beam2 at the downlink frequency f1 for a time interval of tD23. The communication device C23 transmits data to the access point or base station on Beam2 at the uplink frequency f2 for a time interval of tU23.

Referring again to FIG. 5 and continuing to the last beam9, the communication device C91 transmits data to the access point or base station on Beam9 at the uplink frequency f2 for a time interval of tU91. The access point or base station transmits data to the communication device C91 on Beam9 at the downlink frequency f1 for a time interval of tD91. The communication device C92 transmits data to the access point or base station on Beam9 at the uplink frequency f2 for a time interval of tU92. The access point or base station transmits data to communication device C92 on Beam9 at the downlink frequency f1 for a time interval of tD92. The access point or base station transmits data to communication device C93 on Beam9 at the downlink frequency f1 for a time interval of tD93. The communication device C93 transmits data to the access point or base station on Beam9 at the uplink frequency f2 for a time interval of tU93.

Thus, in accordance with some disclosed embodiments, even though the access point or base station does not simultaneously transmit or receive data on a given beam, it is transmitting and receiving data asynchronously across beams. Referring to FIG. 5, the access point or base station transmits data to communication device C11 on Beam1 at the downlink frequency f1 for a time interval of tD11 while at the same time receiving data from communication device C21 on Beam2 at the uplink frequency f2 for a time interval of tu21 and receiving data from communication device C91 on Beam9 at the uplink frequency f2 for a time interval of tu91.

Figure 6:
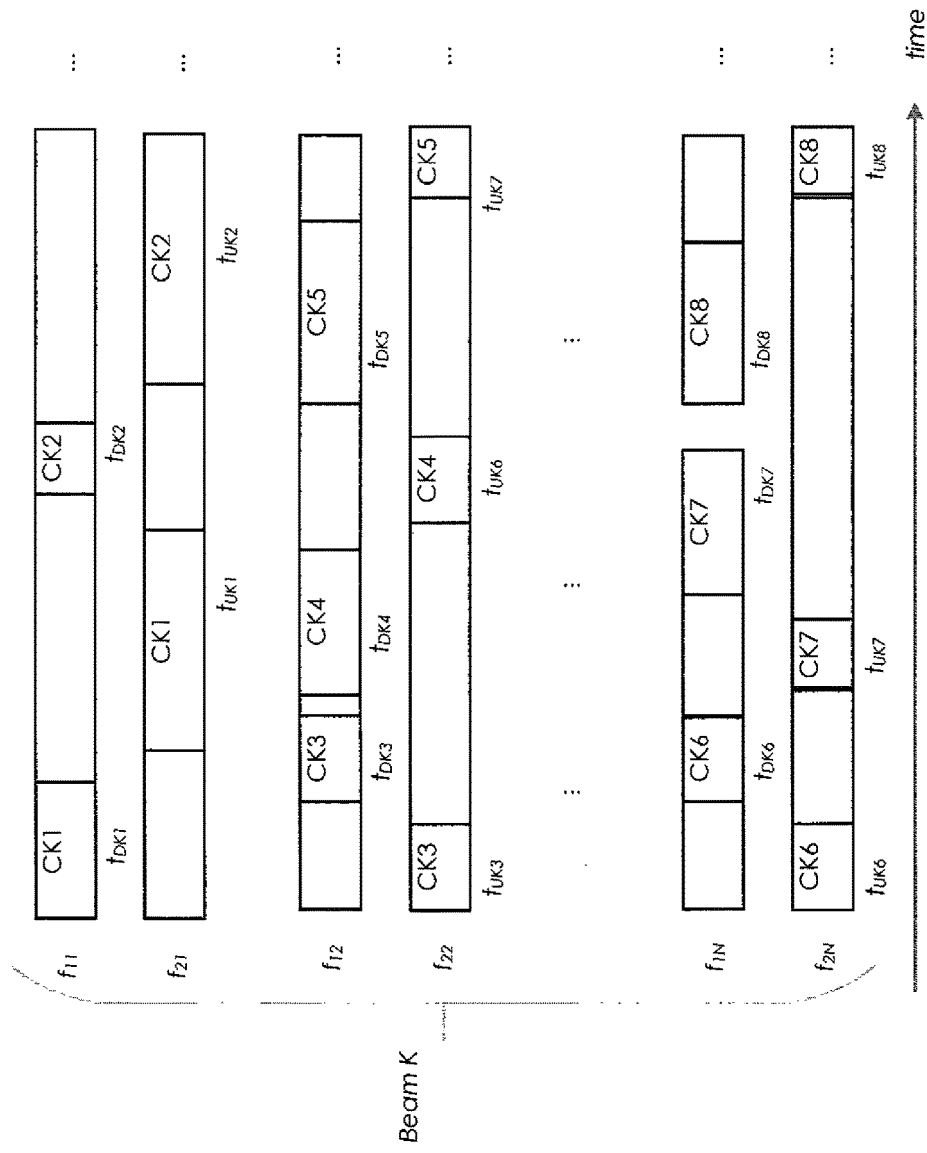

In accordance with other disclosed embodiments shown in FIG. 6, the downlink frequency band f1 is divided into frequency channels f11 to f1N and uplink frequency band f2 is divided into frequency channels f21 to f2N. The channel bandwidths can be same or different. Thus, the downlink frequency band f1 and the uplink frequency band f2 are divided into a plurality of sub-channels.

Referring to FIG. 6, access point or base station 400 is shown communicating with communication devices CK1 to CK9 on Beam K. Access point or base station 400 transmits data to communication device CK1 on Beam K at the downlink frequency channel f11 for a time interval of tDK1. The communication device CK1 transmits data to the access point or base station on Beam K at the uplink frequency channel f21 for a time interval of tUK1. The access point or base station transmits data to communication device CK2 on Beam K at the downlink frequency channel f11 for a time interval of tDK2. The communication device CK2 transmits data to the access point or base station on Beam K at the uplink frequency channel f21 for a time interval of tUK2.

Referring again to FIG. 6, the communication device CK3 transmits data to the access point or base station on Beam K at the uplink frequency channel f22 for a time interval of tUK3. The access point or base station transmits data to the communication device CK3 on Beam K at the downlink frequency channel f12 for a time interval of tDK3. The access point or base station transmits data to communication device CK4 on Beam K at the downlink frequency channel f12 for a time interval of tDK4. The communication device CK4 transmits data to the access point or base station on Beam K at the uplink frequency channel f22 for a time interval of tUK4. The access point or base station transmits data to communication device CK5 on Beam K at the downlink frequency channel f12 for a time interval of tDK5. The communication device CK5 transmits data to the access point or base station on Beam K at the uplink frequency channel f22 for a time interval of tUK5.

Referring to FIG. 6 and continuing, the communication device CK6 transmits data to the access point or base station on Beam K at the uplink frequency channel f2N for a time interval of tUK6. The access point or base station transmits data to the communication device CK6 on Beam K at the downlink frequency channel f1N for a time interval of tDK6. The communication device CK7 transmits data to the access point or base station on Beam K at the uplink frequency channel f2N for a time interval of tUK7. The access point or base station transmits data to communication device CK7 on Beam K at the downlink frequency channel f1N for a time interval of tDK7. The access point or base station transmits data to communication device CK8 on Beam K at the downlink frequency channel f1N for a time interval of tDK8. The communication device C93 transmits data to the access point or base station on Beam K at the uplink frequency channel f2N for a time interval of tUK8.

Thus, access point or base station can simultaneously transmit and receive data to and from communication devices on the same beam using different downlink and uplink channels. Referring to FIG. 6, access point or base station transmits data to communication device CK1 on Beam K at the downlink frequency channel f11 for a time interval of tDK1 while at the same time receiving data from communication device CK3 on Beam K at the uplink frequency channel f22 for a time interval of tUK3 and receiving data from communication device CK6 on Beam K at the uplink frequency channel f2N for a time interval of tUK6.

Figure 7:
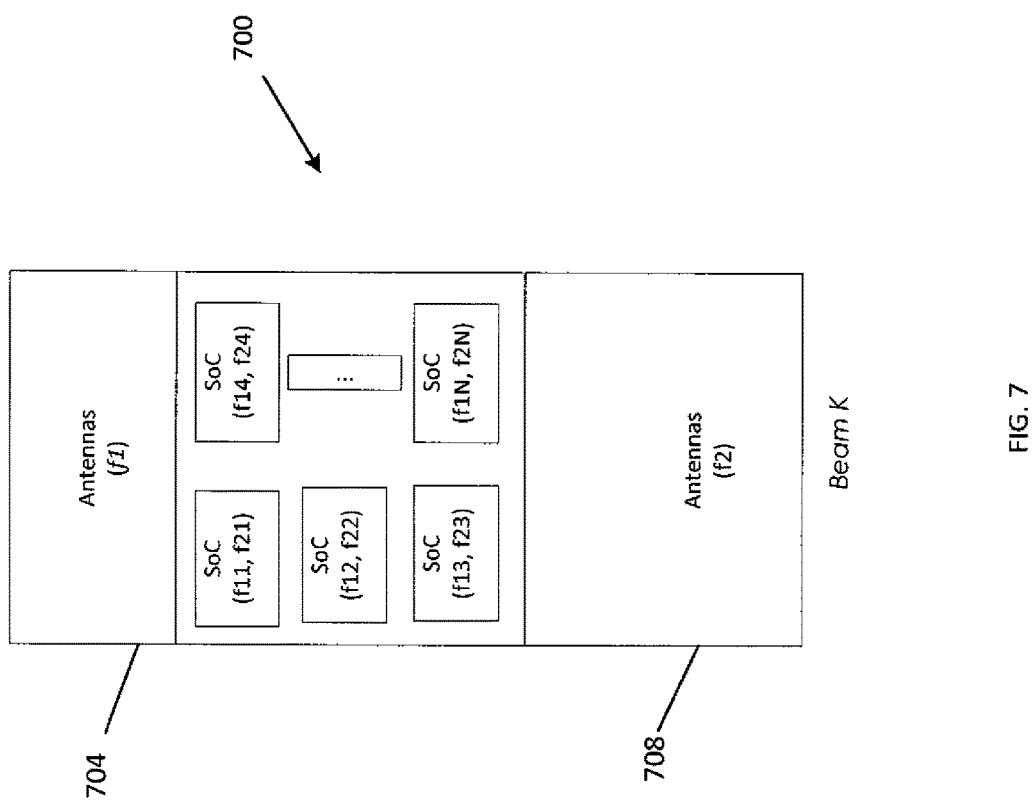
FIG. 7 depicts an apparatus according to disclosed embodiments.

FIG. 7 depicts the base station or access point apparatus 700 for a given beam. Referring to FIG. 7, the apparatus includes antennas 704 to support the downlink transmissions at frequency f1 as well as antennas 708 to receive the uplink transmissions at frequency f2. The apparatus includes a plurality of system-on-chips (SoCs) used to support multiple channels. In the embodiments where frequency channels are supported for the downlink or the uplink or both, a single system-on-a-chip (SoC) can be used to support multiple channels or a dedicated SoC can be used for each of the channels. When a dedicated SoC is used for each of the channel, the SoC includes transmit and receive circuitry for that particular channel.

Those skilled in the art will recognize that, for simplicity and clarity, the full structure and operation of all systems suitable for use with the present disclosure is not being depicted or described herein. Instead, only so much of systems as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

Those skilled in the art to which this application relates will appreciate that other and further additions, deletions, substitutions and modifications may be made to the described embodiments.

What is claimed is:

1. A method of multiplexing downlink and uplink data packets in widely spaced frequencies for providing wireless broadband link between a base station and a plurality of client devices, comprising:
   transmitting a first data packet by the base station to a first client device at a downlink frequency $f_1$ during a first time interval, wherein the base station does not receive data packets from the first client device during the first time interval;
   receiving a second data packet by the base station from a second client device at an uplink frequency $f_2$ during a second time interval, wherein the base station does not transmit data packets to the second client device during the second time interval;
   concurrently transmitting, by the base station at least a portion of the first data packet to the first client device on the downlink frequency f1 and receiving at least a portion of the second data packet from the second client device on the uplink frequency f2, wherein there is a wide separation between the downlink frequency $f_1$ and the uplink frequency $f_2$, wherein the downlink frequency f1 is greater than the uplink frequency f2, and wherein the downlink frequency f1 is in the millimeter wave band and wherein the uplink frequency f2 is less than 7 GHz, and wherein there is no overlap between the downlink frequency f1 and the uplink frequency f2.

2. The method of claim 1, wherein at least a portion of the first time interval overlaps with at least a portion of the second time interval.

3. The method of claim 1, wherein the base station transmits downlink data packets and receives uplink data packets without any guard time intervals.

4. The method of claim 1, wherein the downlink frequency is 28 GHz or 37-40 GHz band.

5. The method of claim 1, wherein the uplink frequency is in an unlicensed shared spectrum.

6. The method of claim 1, wherein the client device is a wireless modem.

7. The method of claim 1, wherein the client device is a mobile communication device.

8. The method of claim 1, wherein the downlink and uplink frequencies are separated by at least 2 GHz.

9. The method of claim 1, wherein the base station generates a plurality of beams to communicate with the client devices.

10. The method of claim 1, wherein the base station generates a plurality of beams to communicate with the client devices, and wherein each beam provides coverage for a predetermined degrees of angle.

11. The method of claim 1, wherein the base station generates a plurality of beams, and wherein each beam is used to communicate with a predetermined number of client devices.

12. A method of multiplexing downlink and uplink data packets in widely spaced frequencies for providing wireless broadband link between a base station and a plurality of client devices, comprising:

transmitting a first data packet by the base station to a first client device at a downlink frequency $f_1$ during a first time interval, wherein the base station does not receive data packets from the first client device during the first time interval;

receiving a second data packet by the base station from a second client device at an uplink frequency $f_2$ during a second time interval, wherein the base station does not transmit data packets to the second client device during the second time interval;

concurrently transmitting by the base station at least a portion of the first data packet to the first client device on the downlink frequency f1 and receiving at least a portion of the second data packet from the second client device on the uplink frequency f2, wherein there is a wide separation between the downlink frequency $f_1$ and the uplink frequency $f_2$, wherein the downlink frequency f1 is greater than the uplink frequency f2, and wherein the downlink frequency f1 is in the millimeter wave band and wherein the uplink frequency f2 is less than 7 GHz, and wherein there is no overlap between the downlink frequency f1 and the uplink frequency f2 receiving a third data packet by the base station from a third client device at the uplink frequency $f_2$ during a third time interval, wherein the base station does not transmit data packets to the third client device during the third time interval; and transmitting a fourth data packet by the base station to the second client device at the downlink frequency $f_1$ during a fourth time interval, wherein the base station does not receive data packets from the second client device during the fourth time interval;

concurrently transmitting by the base station at least a portion of the fourth data packet to the second client device on the downlink frequency f1 and receiving at least a portion of the third data packet from the third client device on the uplink frequency f2.

13. The method of claim 12, wherein at least a portion of the first time interval overlaps with at least a portion of the second time interval.

14. The method of claim 12, wherein the base station transmits uplink data packets and receives downlink data packets without any guard time interval.

15. The method of claim 12, wherein the downlink frequency is 28 GHz or 37-40 GHz band.

16. The method of claim 12, wherein the uplink frequency is in an unlicensed shared spectrum.

17. The method of claim 12, wherein the client device is a wireless modem.

18. The method of claim 12, wherein the client device is a mobile communication device.

19. The method of claim 12, wherein the downlink and uplink frequencies are separated by at least 2 GHz.

20. The method of claim 12, wherein the base station generates a plurality of beams to communicate with the client devices.

21. The method of claim 12, wherein the base station generates a plurality of beams to communicate with the client devices, and wherein each beam provides coverage for a predetermined degrees of angle.

22. The method of claim 12, wherein the base station generates a plurality of beams, and wherein each beam is used to communicate with a predetermined number of client devices.

* * * * *